United States Patent [19]

Pierce

[11] Patent Number: 5,445,398

[45] Date of Patent: Aug. 29, 1995

[54] UTILITY CART WITH VACUUM ADAPTOR

[76] Inventor: Patrick S. Pierce, 510 Wundsgrove Rd., Marietta, Ga. 30067

[21] Appl. No.: 205,591

[22] Filed: Mar. 2, 1994

[51] Int. Cl.⁶ .............................................. B62B 1/06
[52] U.S. Cl. ............................... 280/47.26; 280/47.24; 248/98
[58] Field of Search ............... 280/47.24, 47.26, 47.27, 280/47.315, 641, 47.18; 248/98

[56] References Cited

U.S. PATENT DOCUMENTS

| | | | |
|---|---|---|---|
| 1,713,095 | 5/1929 | Scheffler | 280/47.24 |
| 3,041,026 | 6/1962 | Wilson | 280/47.24 |
| 3,179,332 | 4/1965 | Brighton et al. | 280/47.26 |
| 3,754,771 | 8/1973 | Shagoury | 280/36 C |
| 3,782,752 | 1/1974 | Gobetz | 280/47.26 |
| 3,806,146 | 4/1974 | Shaw | 280/47.26 |
| 3,830,514 | 8/1974 | Green | 280/47.24 |
| 3,845,968 | 11/1974 | Larson | 280/36 C |
| 3,903,565 | 9/1975 | Hicks | 15/352 |
| 4,179,132 | 12/1979 | Rich | 280/47.26 |
| 4,341,393 | 7/1982 | Gordon et al. | 280/47.26 |
| 4,452,468 | 6/1984 | Eads et al. | 280/641 |
| 4,783,090 | 11/1988 | Moulton | 280/47.26 |
| 5,102,154 | 4/1992 | McDonald | 280/47.24 |
| 5,195,765 | 3/1993 | Lacey, Jr. | 280/47.26 |
| 5,209,517 | 5/1993 | Shagoury | 280/654 |

FOREIGN PATENT DOCUMENTS

| | | | |
|---|---|---|---|
| 3936099 | 5/1991 | Germany | 280/47.26 |
| 942855 | 11/1963 | United Kingdom | 280/47.24 |

*Primary Examiner*—Brian L. Johnson
*Assistant Examiner*—Carla Mattix
*Attorney, Agent, or Firm*—Kenneth S. Watkins, Jr.

[57] ABSTRACT

A utility cart is disclosed for holding a collection bag. The device comprises a frame, a support ring, and an integral ring clamp for clamping the rim of the bag to the support ring. The cart may additionally comprise wheels for transporting the cart along the ground, and a pivoting handle for grasping the cart. The cart may be folded for convenient storage. An enclosed cover for the cart with an optional hose attachment for connection to an external vacuum or blower is disclosed.

5 Claims, 5 Drawing Sheets

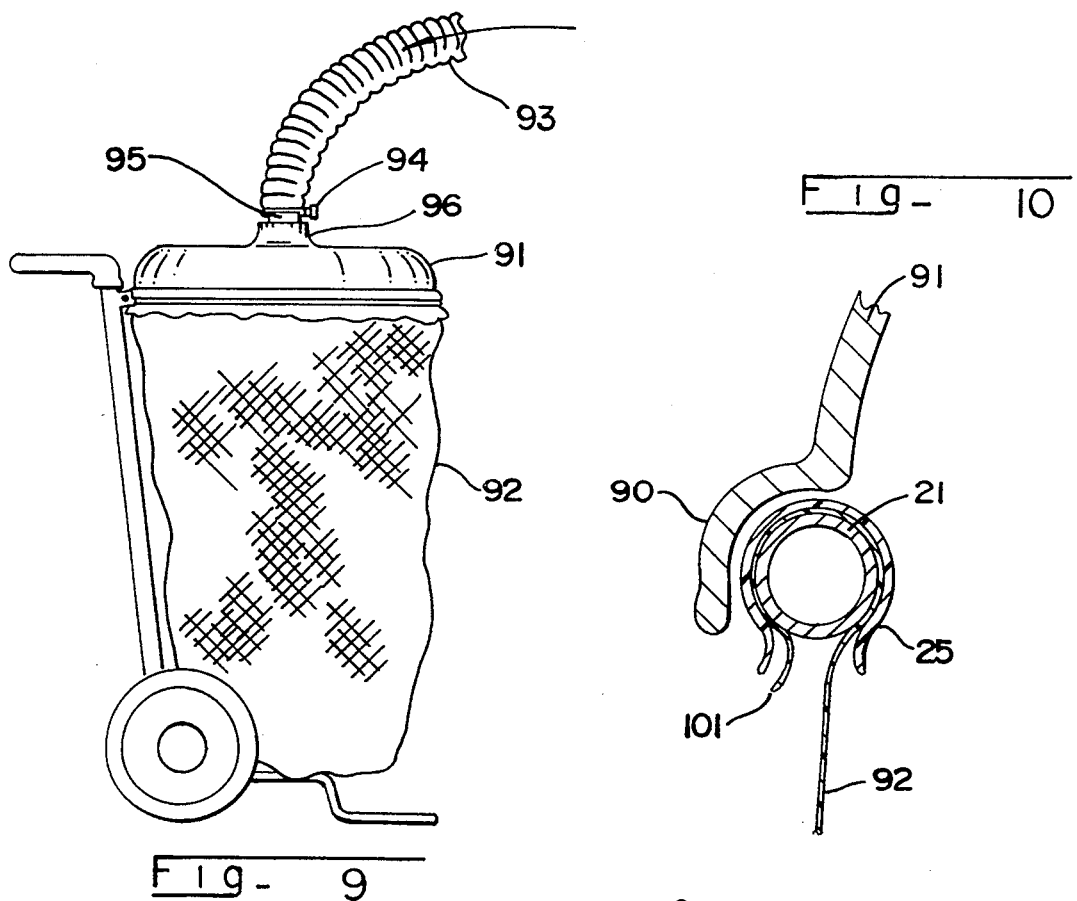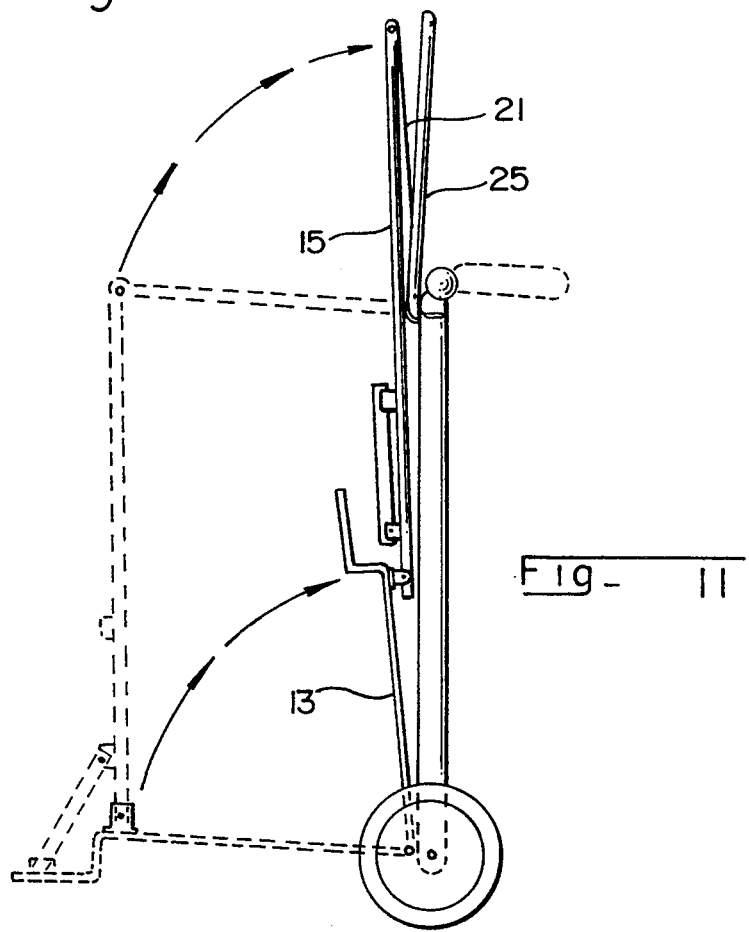

UTILITY CART WITH VACUUM ADAPTOR

BACKGROUND

This invention relates to utility cads, and more specifically cads capable of holding and transporting plastic leaf or garbage bags, or alternatively, vacuum collection bags.

The growth of modern suburban housing developments over the recent years has resulted in an ever increasing demand for better methods of maintaining attractive landscaping features for these homes. This is especially true as housing sub-divisions become more and more restrictive as to yard and garden maintenance requirements, and to lawn waste storage and pickup requirements.

One product which has grown in popularity is a cart for holding and transporting plastic leaf and garbage bags. These devices can be used to conveniently hold and transpod leaves which have been collected by raking, blowing, or collected by lawn tractors or mowers. The cad can be easily transported about the lawn area. Full waste bags may be transported to a temporary storage area, or left in the cad until disposal or recycling. Additionally, the cad can be used for transporting bags of household garbage from the house to the temporary storage area or to the pickup area.

The growing demand for bag cads has led to various improvements including cads capable of being folded for more convenient storage when not in use, and designs which incorporate features for supporting the bag opening in a fully open position for easier filling of the bag. As an example, U.S. Pat. Nos. 3,754,771 to Shagoury and 3,845,968 to Larson disclose folding bag cads employing a support ring to support the bag rim utilizing clamps or elastic bands.

Up to now, these devices have suffered limitations which have restricted their usefulness. These limitations include lack of an effective bag rim clamp integral with the cad which can be quickly and effectively employed and which doesn't prevent folding for storage. Also, with the growth in popularity of yard vacuum and blowing equipment, a need exists for holding and utilizing open mesh bags for collection from these devices. The bag cart should be able to be used for both kinds of bags to reduce the cost and storage problems associated with two separate carts.

One objective of the present invention is to provide a cart for holding and transporting bags of leaves or garbage which allows a bag to be quickly and easily installed on the cart and can be quickly and easily folded for storage.

Another objective of the present invention is to provide a rim clamp for a bag cart which securely clamps the rim of the bag to a support ring and the support clamp is integral with the cart.

Another objective of the present invention is to provide a rim clamp for a bag cart which can be folded with the cart for convenient storage.

Another objective of the present invention is to provide an attachment for the cart which allows the use of an open mesh bag for collection of leaves or waste from a vacuum or blower.

Another objective is to provide an enclosed cover for the bag.

Another objective of the present invention is to provide a utility cart which is simple and inexpensive to produce.

These and other objects of the invention will be apparent to those skilled in the art from the following detailed description of the preferred embodiment of the invention.

SUMMARY

My invention addresses the need for an improved bag cart for leaves and garbage which addresses the shortcomings of previous carts. It comprises a cart for holding and carrying a collection bag such as a plastic leaf or garbage bag. The cart incorporates an integral bag rim clamp which allows the bag to be quickly inserted in the cart and the bag rim securely clamped to a support ring. The cart, including the integral bag rim clamp, is foldable for convenient storage. A vacuum/blower cover is included which clamps and secures an open mesh bag for collection from the vacuum/blower.

The cart comprises a vertical frame with a support ring attached to the top of the frame for supporting the rim of a bag. In its operating position, the support ring is horizontally supported from the frame. A ring clamp is attached to the frame so that the ring clamp can be engaged with the support ring. A bag such as a plastic bag is inserted into the support ring with the rim of the bag lapping over the support ring. The ring clamp, when engaged with the support ring, clamps the bag rim to the support ring.

In its preferred embodiment, the support ring is pivotally mounted to the frame. A bottom support shelf for supporting the bottom of the bag is pivotally mounted to the bottom of the frame. A second vertical support is pivotally connected to the support ring and the bottom support shelf. A folding brace locks the support ring and the bottom support shelf in the horizontal position or operating position, and unlocks to allow the support ring and bottom support shelf to assume a nearly vertical position for storage.

The preferred embodiment comprises wheels connected to the bottom of the frame, and a support leg for supporting the cart frame in a vertical position and preventing unwanted movement of the cart. A horizontally pivoting handle connected to the top of the frame provides a means for grasping the cart for transporting and folds fro convenient storage.

A cover attachment for the cart snaps over the support ring or ring clamp and clamps the cover to the device. A hose connection can be added to the cover which allows attachment of a hose from a vacuum/blower to collect the discharge from the hose.

BRIEF DESCRIPTION OF THE DRAWINGS

These and other features, aspects, and advantages of the present invention will become better understood with regard to the following description, appended claims, and accompanying drawings where:

FIG. 9 is an elevation drawing of the preferred embodiment of the present invention with a vacuum/blower cover, FIG. 10 is a detail cross section of the cover engaging the ring clamp, and FIG. 11 is an elevation of the preferred embodiment in the folded position.

DETAILED DESCRIPTION

The preferred embodiment of the present invention invention is a cart comprising a frame, an upper support ring for supporting the rim of a bag, an integral ring clamp attached to the frame for clamping the rim of a bag to the upper support ring, a lower support shelf for supporting the bottom of the bag, wheels attached to the bottom of the frame for transporting the cart, a support leg for supporting the cart frame in a vertical resting position, and a horizontally pivoting handle for grasping the cart for transporting the cart.

Figure 1:
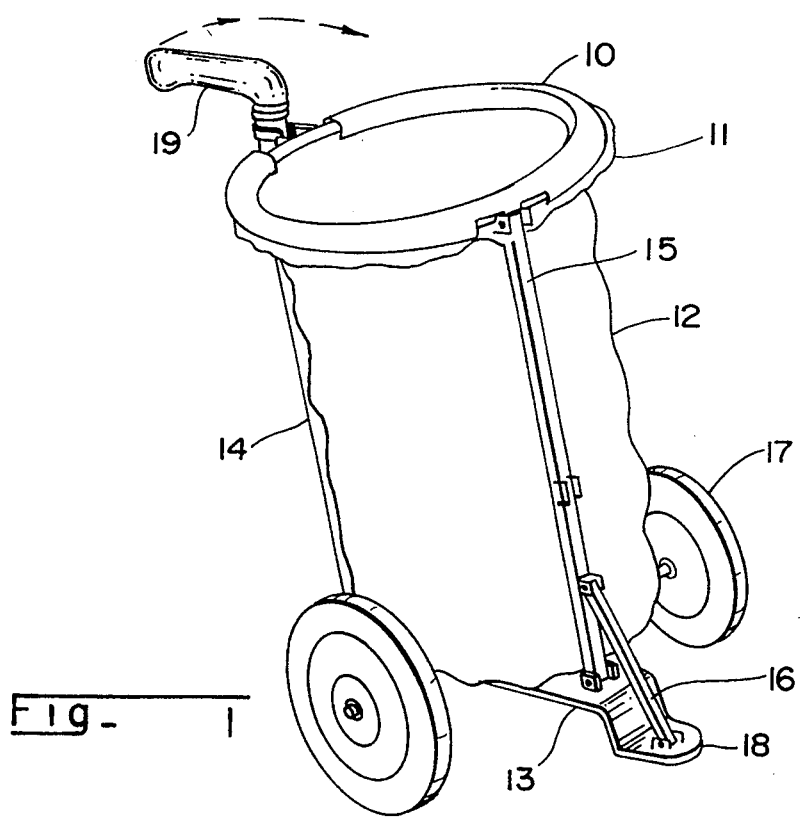
FIG. 1 is a perspective drawing of the preferred embodiment of the present invention.

FIG. 1 shows a perspective drawing of the preferred embodiment of the present invention. Support ring and clamp assembly 10 clamps rim 11 of bag 12. Support ring and clamp assembly 10 and bottom support shelf 13 are pivotally attached to frame or main column 14. Vertical support 15 is pivotally attached to support ring and clamp assembly 10 and to bottom support shelf 13. Brace 16 locks vertical support 15, support ring and ring clamp assembly 10, and bottom support shelf 13 in the operating position.

A base comprising wheels 17 attached to the bottom of main column 14 allow the cart to be easily transported. Support leg 18 supports the cart so the main column is essentially vertical in the rest position. Pivot handle 19 provides a convenient handle to grip the cart for transporting.

Figure 2:
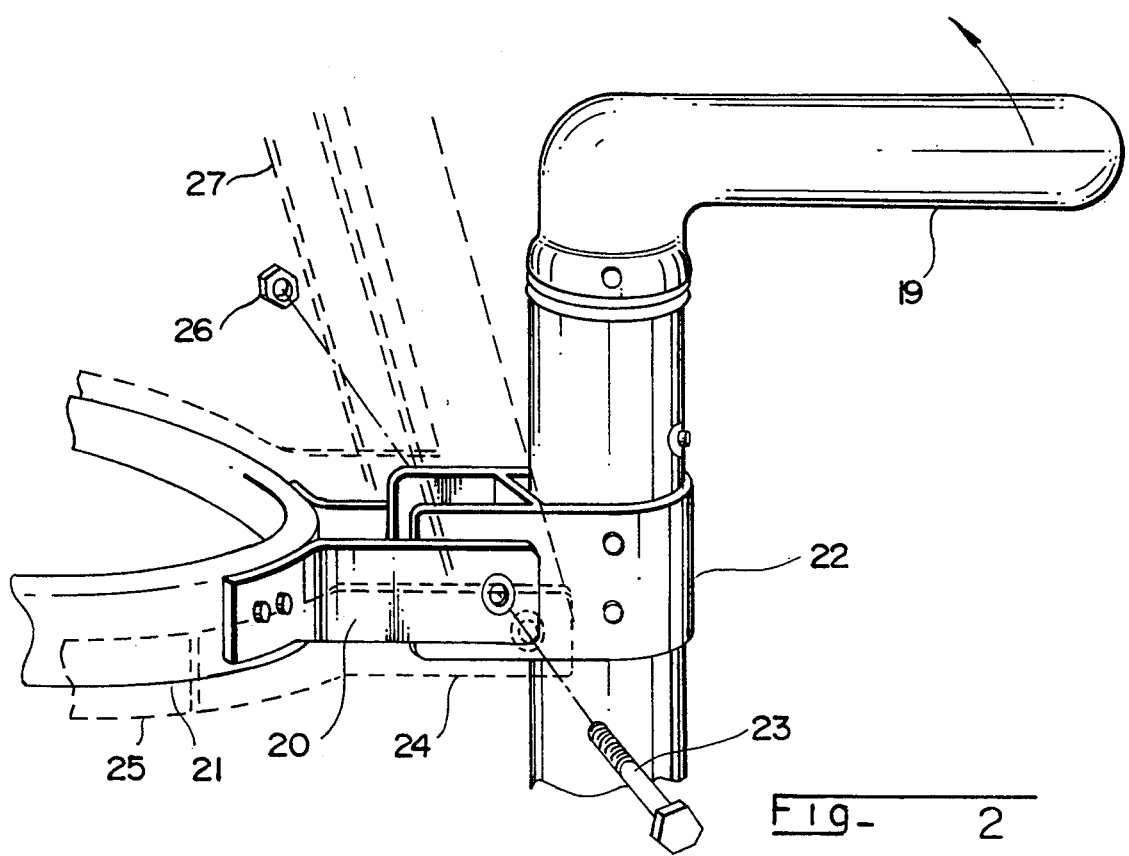
FIG. 2 is a detail perspective of the support ring and ring clamp brackets.

FIG. 2 is a detail perspective of the support ring and ring clamp assembly. Support ring bracket 20 of support ring 21 is pivotally attached to column bracket 22 by pivot pin 23. In a similar manner, ring clamp bracket 24 of ring clamp 25 is pivotally attached to column bracket 22 by pivot pin 23. Ring clamp 25 has a "C" shaped cross section (see 25 of FIG. 3) to snap on or engage support ring 21. Pivot pin 23 is retained in bracket 22 by retaining nut 26. The pivoting or hinge arrangement of ring clamp 25 allows ring clamp 25 to be raised as in position 27 for insertion of a bag in support ring 21. After the rim of the bag is lapped over support ring 21, ring clamp 25 is lowered and engaged with support ring 21 to clamp the bag rim to support ring 21. Although the support ring and ring clamp assembly is circular as shown from the top, it may be other shapes such as rectangular, and of various sizes to allow for special bag shapes.

Figure 3:
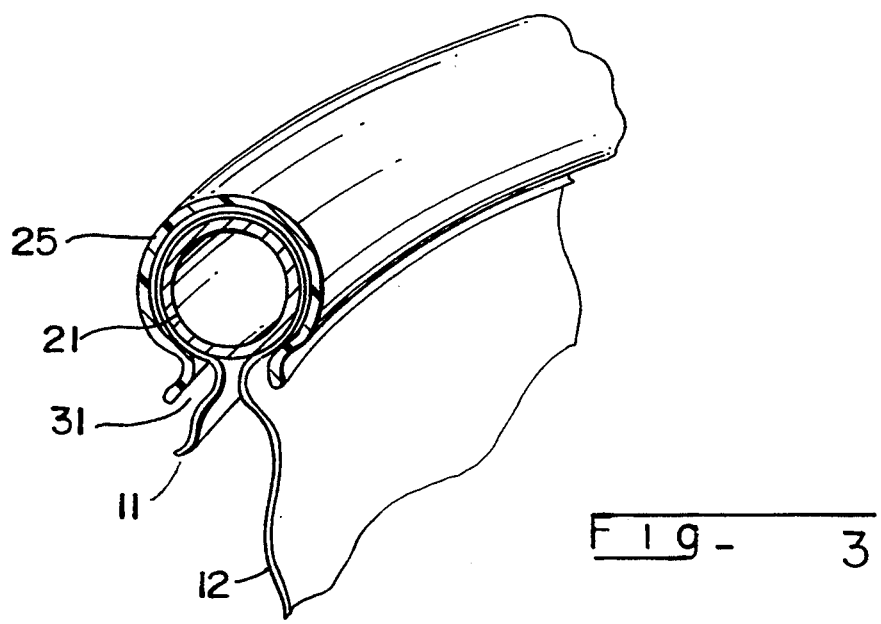
FIG. 3 is detail cross section of the support ring and ring clamp.
Figure 4:
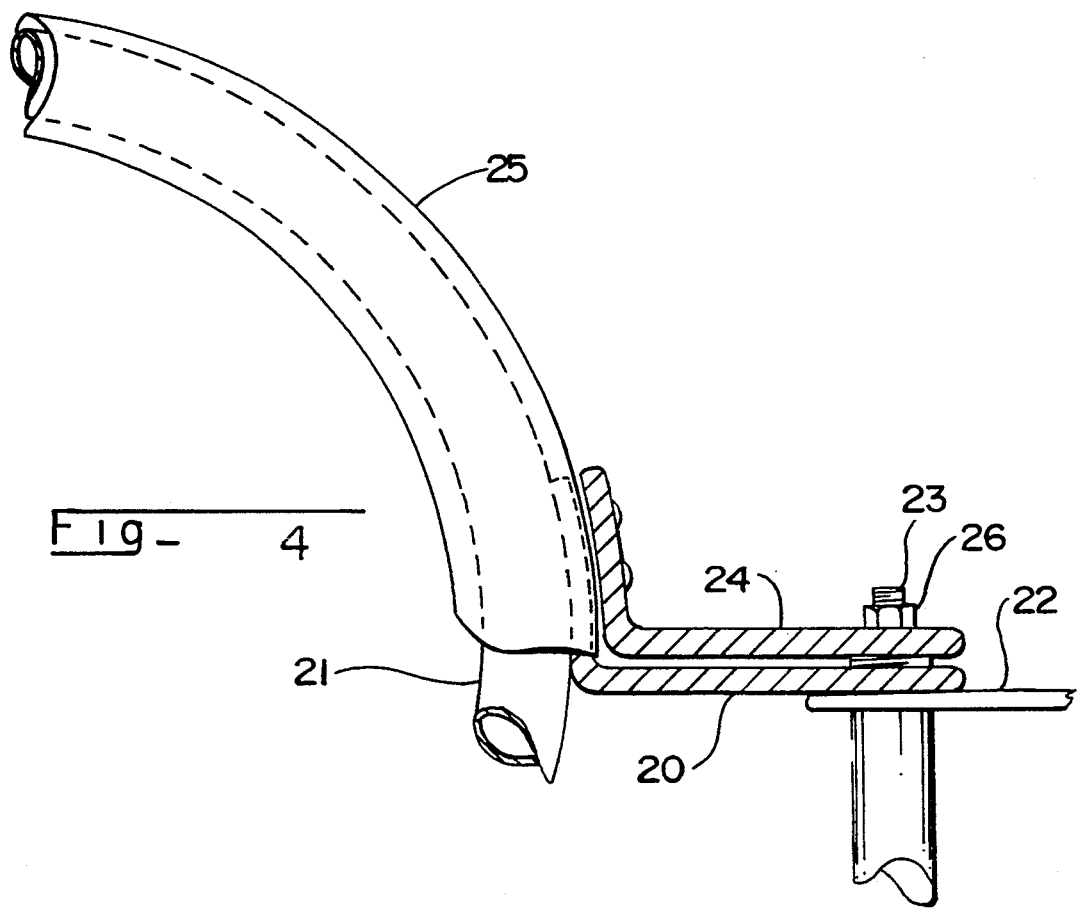
FIG. 4 is a top view of the support ring and ring clamp brackets.

FIG. 3 shows a cross sectional detail of support ring 21 and ring clamp 25 in the engaged position. Bag rim 11 of bag 12 is lapped over support ring 21 and clamped between support ring 21 and ring clamp 25. Ring clamp 25 is made of a resilient material such as plastic to allow the opening of the "C" section 31 to slip over support ring 21 during the clamping or engaging of ring clamp 25. FIG. 4 is a top view of support ring 21 and ring clamp 25. Support ring bracket 20 and ring clamp bracket 24 are pivotally connected to column bracket 22 by pin 23 and nut 26. Alternatively, ring clamp 25 and/or support ring 21 can be supported from main column 14 by resilient hinges.

Figure 5:
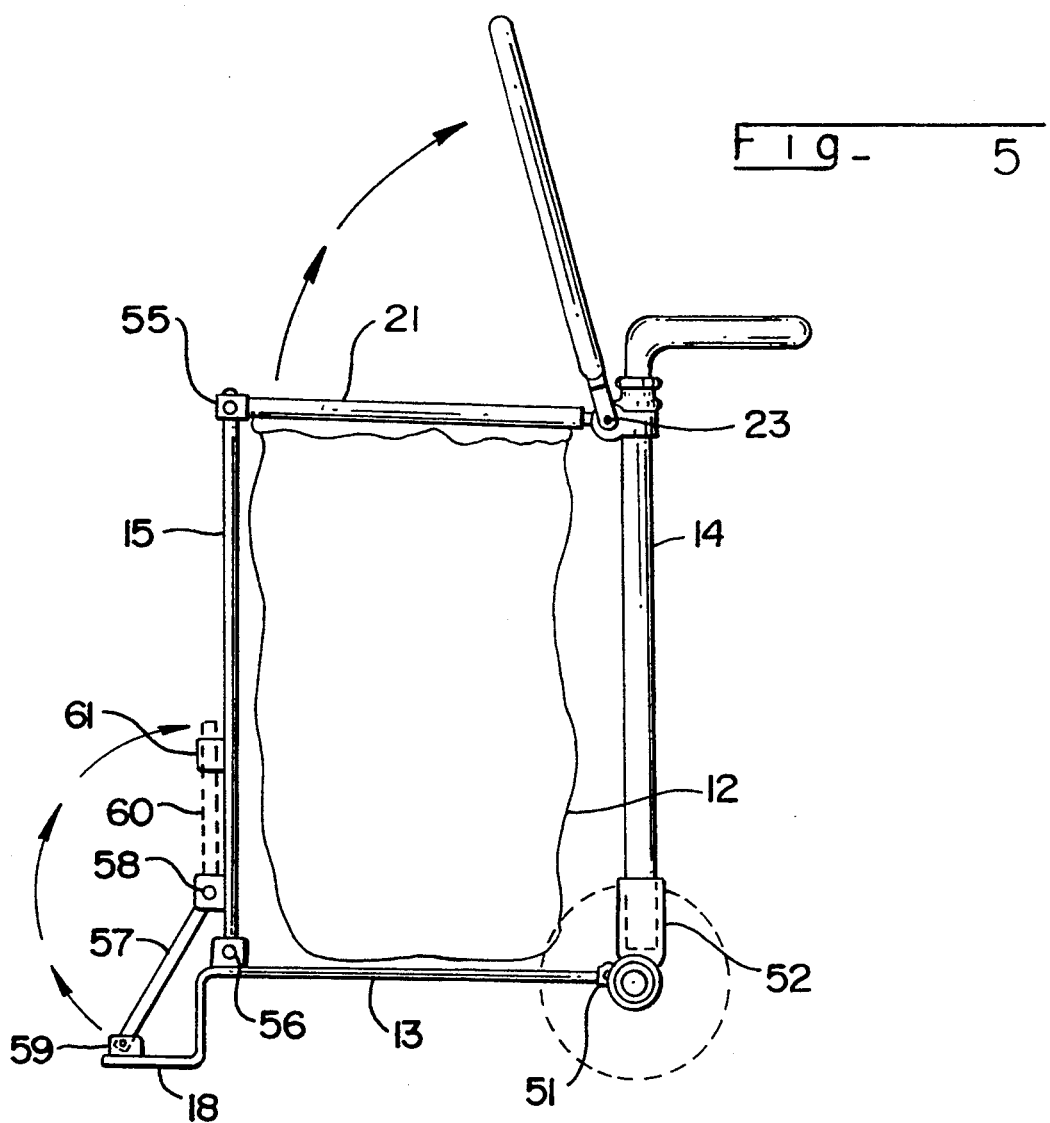
FIG. 5 is a side elevation drawing of the preferred embodiment.

FIG. 5 is a side elevation drawing showing the frame construction of the cart. Support ring 21 is pivotally connected to main column 14 at pin 23 as discussed previously. Bottom support shelf 13, which supports the bottom of bag 12 is pivotally connected to main column 14 at pin 51 of bottom column bracket 52. Vertical support 15 is pivotally connected to support ring 21 at pin 55 and to bottom support shelf 13 at pin 56. Diagonal brace 57 connects vertical support 15 at pin 58 to support leg 18 at brace clamp 59. Diagonal brace 57 locks the frame assembly in the operating position where support ring 21 is in a substantially horizontal position as shown in the figure. Diagonal brace 57 can be released from brace clamp 59 and pivoted about pin 58 to the brace storage position 60. Diagonal brace 57 is retained in this position by storage clamp 61.

Figure 6:
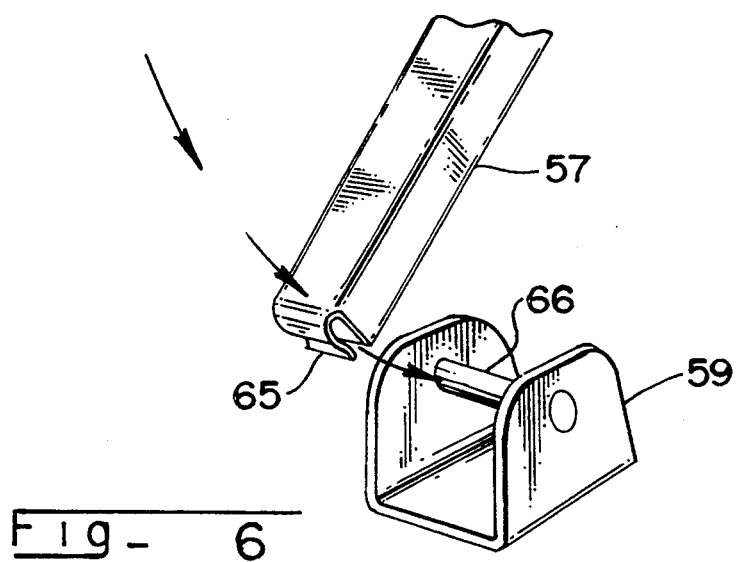
FIG. 6 is a detail perspective drawing of the diagonal brace of FIG. 5.

FIG. 6 is a detail perspective of brace clamp 59. Spring clamp 65 of diagonal brace 57 engages latch pin 66 of brace clamp 59 to lock the frame in the operating position. Spring clamp 65 may be of spring steel or of a plastic material. In the preferred embodiment, latch pin 66 is made of metal.

Figure 7:
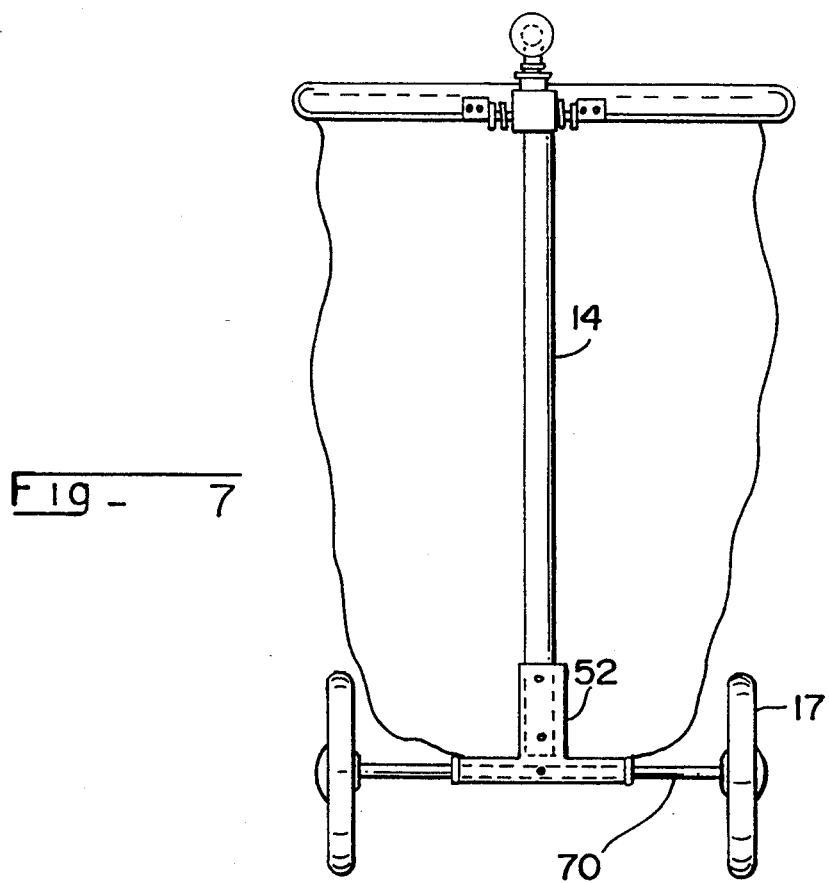
FIG. 7 is a back elevation drawing of the preferred embodiment.

FIG. 7 is a back elevation drawing of the preferred embodiment. Wheels 17 are rotateably supported by axle 70 utilizing conventional bushings (not shown) or any other appropriate bearing to allow easy turning and maneuverability of the cart. Axle 70 is supported by "T" shaped bottom column bracket 52 at the bottom of main column 14.

Figure 8:
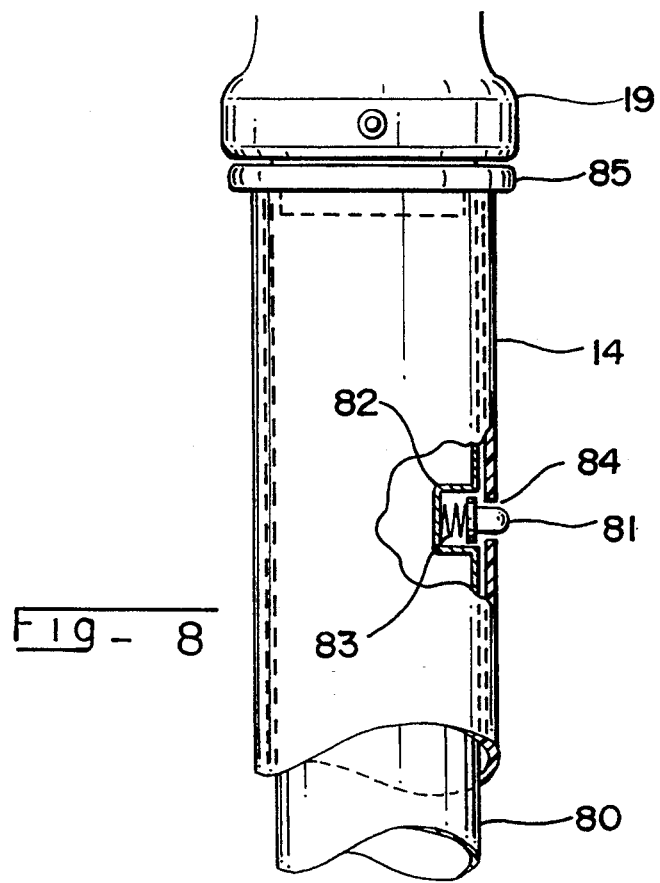
FIG. 8 is a detail cutaway of the handle latch.

Referring to FIG. 1 and FIG. 8, shaft 80 of handle 19 is inserted in the top of main column 14. Latch button 81 is mounted in recess 82 of shaft 80. Button spring 83 biases latch button 81 outward to engage aperture 84 of main column 14 to latch handle 19 in its operating position. Latch button 81 may be pressed to release the latch and rotate handle 19 as shown in FIG. 1. Bushing 85 prevents over insertion of shaft 80.

FIG. 9 shows the preferred embodiment of the present invention with an enclosed cover. The cover encloses a bag in the device, or the cover can have an aperture 96 for receiving the discharge of an external vacuum/blower unit. Cover rim 90 fits over ring clamp (25 of FIG. 10) to seal and attach cover 91 to the ring clamp. Discharge hose 93 is clamped by clamp 94 to sleeve 95. Sleeve 95 is open through cover 91 to allow discharged material from hose 93 to be collected by mesh bag 92.

FIG. 10 is a detail cross section of the cover attachment method of the preferred embodiment. The rim 101 of open mesh bag 92 is lapped over support ring 21. Ring clamp 25 is clamped or engaged to support ring 21 to clamp the bag rim as described earlier. Cover rim 90, having a "C" shaped cross section, is snapped over ring clamp 25 to engage ring clamp 25. Alternatively, cover rim 90 may be made to snap over support ring 21, in which case cover rim 90 clamps bag rim 101 to support ring 21. In this case, ring clamp 25 would be left in a raised position so as not to interfere with cover 91. Cover rim 90 is made of a resilient material such as plastic and may be integrally combined with cover 91 as shown in FIG. 10.

When brace clamp 57 of FIG. 6 is unlatched and placed in the storage position 60, the cart may be folded as shown in FIG. 11. In this position, support ring 21, ring clamp 25, and bottom support shelf 13 are in a substantially vertical position. The cart can then be stored as-is, or hung by ring clamp 25 or support ring 21.

In its preferred embodiment, the frame members of the cart are made of aluminum tubing. Ring clamp 25 and cover 91 are made of resilient plastic material. Bottom support shelf 13, brackets and support leg 18 are made of formed aluminum pate. Bottom column bracket 52 is made of aluminum casting. Pivots and latches are made of steel, preferably corrosion resistant. Alternatively, the frame members may be made of plastic tubing.

Ring clamp 25 may be trimmed as shown in FIG. 1 to prevent interference with upper vertical support pin 55 bracket. Cover rim 90 may be trimmed to prevent interference with support ring and/or ring clamp brackets 20 and 24.

Accordingly the reader will see the disclosed utility cart can quickly and easily clamp a collection bag to the cart utilizing an integral attached ring clamp. The device comprises the following additional advantages:

it is simple and can be manufactured at low cost,
it can be folded for convenient storage,
it can be provided with an enclosed cover which can be quickly removed and replaced, and
it can be quickly and easily adapted for collection from external vacuums or blowers.

Although the description above contains many specifications, these should not be construed as limiting the scope of the invention but as merely providing illustrations of some of the presently preferred embodiments of this invention. For example, latches may be used to clamp cover 91 to support clamp 21, etc.

Thus the scope of the invention should be determined by the appended claims and their legal equivalents, rather than by the examples given.

I claim:

1. A device for holding and transporting bags, the device comprising:
    (a) a support ring, the support ring being circular shaped and being of a size and shape such that a rim of a bag can be lapped over the support ring when the bag is inserted into the ring, the ring being pivotally connected to a frame for supporting the support ring in a horizontal position above the ground;
    (b) a ring clamp for clamping the rim of the bag to the support ring, the ring clamp being circular shaped and having a "C" shaped cross section to clamp over the ring and therefore clamp the rim of the bag to the support ring, the ring clamp being pivotally connected to the frame; anti wherein the frame comprises a main column, a bottom support shelf pivotally connected to the main column, a vertical support pivotally connected to the support ring and the bottom support shelf, two wheels rotatably connected to the main column, and a support leg for supporting the frame in a rest position on the ground and preventing unwanted motion;
    (c) a brace which locks the frame in an operating position wherein the support ring and bottom support shelf are in a horizontal position, the brace being unlocked to allow the frame to be folded in a storage position wherein the support ring and bottom support shelf are in a generally vertical position; and
    (e) a handle connected to the frame which can be rotated in a horizontal plane for storage.

2. A device as in claim 1 further comprising a cover, the cover comprising an attaching means for attaching the cover to the frame.

3. A device as in claim 2 wherein the cover further comprises an aperture for receiving the discharge of an external vacuum/blower.

4. A device as in claim 2 wherein the attaching means comprises a rim, the rim being made of a resilient material and having a "C" shaped cross section and engaging the support ring.

5. A device as in claim 2 wherein the attaching means comprises a rim, the rim being made of a resilient material and having a "C" shaped cross section and engaging the ring clamp.

* * * * *